United States Patent
Barbosa et al.

(10) Patent No.: US 7,911,755 B2
(45) Date of Patent: Mar. 22, 2011

(54) CIRCUIT ARRANGEMENT FOR ELECTRICALLY CONTROLLING POWER AND COOLING ARRANGEMENT

(75) Inventors: Peter Barbosa, Taoyuan County (TW); Luc Meysenc, Saint Egrève (FR); Manfred Winkelnkemper, Ennetbaden (CH); Peter Steimer, Ehrendingen (CH)

(73) Assignee: ABB Research Ltd, Zurich (CH)

( * ) Notice: Subject to any disclaimer, the term of this patent is extended or adjusted under 35 U.S.C. 154(b) by 146 days.

(21) Appl. No.: 12/348,812

(22) Filed: Jan. 5, 2009

(65) Prior Publication Data

US 2009/0141455 A1    Jun. 4, 2009

Related U.S. Application Data

(63) Continuation of application No. PCT/EP2007/055343, filed on May 31, 2007.

(30) Foreign Application Priority Data

Jul. 7, 2006    (EP) .................................... 06405290

(51) Int. Cl.
*H02H 5/04* (2006.01)
*H02H 7/08* (2006.01)
(52) U.S. Cl. ........................... 361/103; 361/23; 361/93.8
(58) Field of Classification Search .................. 361/103, 361/23, 93.8
See application file for complete search history.

(56) References Cited

U.S. PATENT DOCUMENTS

| | | | |
|---|---|---|---|
| 5,898,582 A | 4/1999 | Denis et al. | |
| 6,671,152 B1* | 12/2003 | Hersel et al. | 361/93.8 |
| 7,149,064 B2* | 12/2006 | Nolden et al. | 361/23 |
| 2002/0092307 A1* | 7/2002 | Ghoshal | 62/3.7 |
| 2005/0047044 A1* | 3/2005 | Nolden et al. | 361/103 |
| 2006/0267192 A1* | 11/2006 | Chen | 257/724 |

FOREIGN PATENT DOCUMENTS

| | | |
|---|---|---|
| DE | 199 04 279 A1 | 8/2000 |
| EP | 0 590 502 A2 | 4/1994 |
| EP | 0 671 809 A2 | 9/1995 |
| EP | 0 802 619 A1 | 10/1997 |
| EP | 0 933 867 A1 | 8/1999 |

OTHER PUBLICATIONS

Form PCT/ISA/210 (International Search Report) dated Oct. 5, 2007.
Non-English version of Form PCT/ISA/237 (Written Opinion of the International Searching Authority) dated Oct. 5, 2007.
European Search Report (with English translation of category of cited documents) dated Mar. 21, 2007.
International Preliminary Report on Patentability dated Jan. 13, 2009.

\* cited by examiner

*Primary Examiner* — Bao Q Vu
(74) *Attorney, Agent, or Firm* — Buchanan Ingersoll & Rooney PC

(57) ABSTRACT

A circuit that electrically controls power includes at least one power control device and at least one heat extraction device. The at least one extraction device is in thermal contact with the at least one power control device. The heat extraction device is arranged such that it can be clamped to a fixed predefined electric potential and electrically insulated by the at least one power control device.

9 Claims, 3 Drawing Sheets

CIRCUIT ARRANGEMENT FOR ELECTRICALLY CONTROLLING POWER AND COOLING ARRANGEMENT

RELATED APPLICATIONS

This application claims priority under 35 U.S.C. §119 to EP Application 06405290.5 filed in Europe on Jul. 7, 2006, and as a continuation application under 35 U.S.C. §120 to PCT/EP2007/055343 filed as an International Application on May 31, 2007 designating the U.S., the entire contents of which are hereby incorporated by reference in their entireties.

TECHNICAL FIELD

The present disclosure relates to electronic circuit arrangements for electrically controlling power, and relates in particular to arrangements for dissipating heat from power semiconductor components arranged in the power control devices, such as thyristor elements, IGBTs (Insulated Gate Bipolar Transistor), and power field effect transistors (Power FET), for example.

Interfaces between such power semiconductor components and the rest of the circuit arrangement or environment comprise electrical interfaces for the electrical connection of the power semiconductor components and thermal interfaces, which are designed in particular for efficiently dissipating heat that arises during the operation of the power semiconductor components.

Specifically, the present disclosure relates to a circuit arrangement for electrically controlling power with power semiconductor components, which comprises at least one power control device and at least one heat dissipating device having a thermal contact with the at least one power control device.

BACKGROUND INFORMATION

The heat dissipating devices for dissipating the heat generated in the power control devices are designed in particular with regard to avoiding excessively large differential voltages between electronic components and the heat dissipating devices, which are thermally and electrically conductive.

Circuit arrangements for electrically controlling power have voltage differences between individual circuit components, such as power semiconductor components, for example, among one another and between components and corresponding heat dissipating devices, such as cooling elements, for example, which voltage differences can reach high values through to breakdown voltages.

In known circuit arrangements, power semiconductor components are arranged on heat dissipating devices which are connected to a ground and are therefore grounded or put at ground potential. Such conventional power control devices for controlling three-phase AC currents and AC voltages are arranged with all the power control modules on a single heat dissipating device, which is clamped or connected to zero volts, such as ground M, for example, as shown in FIG. 1. The circuit arrangement in accordance with FIG. 1 is designed in triple fashion for the power control of three-phase AC currents and AC voltages. The circuit arrangement in FIG. 1 comprises three switching units E1, E2 and E3. The individual switching units E1, E2 and E3 are in turn formed from power semiconductor components T1a, T2a and T3a, T4a respectively connected in series.

A capacitor C1 is discharged via the series circuit comprising two resistors R1 and R2. The other two power control devices E2 and E3 in FIG. 1 are formed in a similar manner. All the power semiconductor components T1a, T2a, . . . , T3c, T4c are arranged on a heat dissipating device W0 for cooling.

Said heat dissipating device W0 has not only a good thermal conductivity but also a high electrical conductivity. During operation of the circuit arrangement, care must be taken to ensure that voltage differences between connection points of the power semiconductor components, on the one hand, and the heat dissipating device W0, on the other hand, do not exceed a specific predetermined maximum potential difference value—that is to say a breakdown voltage.

For solving the problem it has been proposed to provide individual heat dissipating devices W1, W2, W3, W4, W5 and W6 for in each case a pair of power semiconductor components, as shown in FIG. 2. Although such an arrangement avoids large potential differences between all of the power semiconductor components and a single heat dissipating device W0, as shown in FIG. 1, the number of circuit components required is disadvantageously increased.

Disadvantageously, such an arrangement can only be provided for single-component or double-component arrangements. The potential of the corresponding heat conducting device W1-W6 is thus clamped to a centre potential between the two power semiconductor components, which limits the voltage loading to approximately a quarter of the link voltage.

A significant disadvantage of the circuit arrangement shown in FIG. 2 furthermore consists in the fact that such a high number of heat dissipating devices, in the case shown 18 heat dissipating devices for a three-phase system (FIG. 2 shows the circuit components for just one phase), is extremely susceptible to faults and expensive.

Moreover, inexpediently it is not possible to provide such a heat dissipating arrangement for H bridge modules since the latter do not have a common centre potential point. Thus, a solution proposed in accordance with FIG. 2 can reduce the dielectric voltage loading of single-switch packages or dual-switch packages, but disadvantageously a cooling method of this type cannot be used for more recent arrangements such as H bridge modules.

EP 0933 867 A1 specifies a generic electronic circuit arrangement for electrically controlling power, wherein, in FIG. 2b of EP 0933 867 A1 (reference symbols used below refer to EP 0933 867 A1), the heat dissipating device (14) is electrically connected to the power control device (10) and an electrical insulation (13) is disclosed only between the heat dissipating device (14) and cooling fins (0), but not between the heat dissipating device (14) and the power control device (10).

A further generic electronic circuit arrangement for electrically controlling power is specified in EP 0 802 619 A1.

SUMMARY

The thermal interfaces between power semiconductor components and the rest of the circuit arrangement or environment serve for dissipating heat. Electrical interfaces for the electrical connection of the power semiconductor components are additionally provided. Consequently, potential differences can occur between electronic components and heat dissipating devices.

An efficient heat dissipating device is disclosed for power control modules or power control devices for electrically controlling power which have a small number of individual components in conjunction with a high voltage breakdown strength.

This object is achieved according to the disclosure by means of a circuit arrangement for electrically controlling power.

A circuit arrangement for electrically controlling power, comprising: a) at least one power control device; and b) at least one heat dissipating device having a thermal contact with the at least one power control device; wherein c) the heat dissipating device is clamped to a fixedly predetermined electrical potential, and wherein d) the at least one heat dissipating device is arranged in a manner electrically insulated from the at least one power control device.

In another aspect, a power-control arrangement is disclosed. Such an arrangement comprises at least one power control device, and a heat extraction device in thermal contact with the at least one power control device, the heat extraction device being configured to be clamped to a defined electric potential, and to be electrically insulated by the at least one power control device.

BRIEF DESCRIPTION OF THE DRAWINGS

An exemplary embodiment of the disclosure is illustrated in the drawing and explained in more detail in the description below.

In the drawing.

In the figures, identical reference symbols designate identical or functionally identical components or steps.

DETAILED DESCRIPTION

Figure 1:
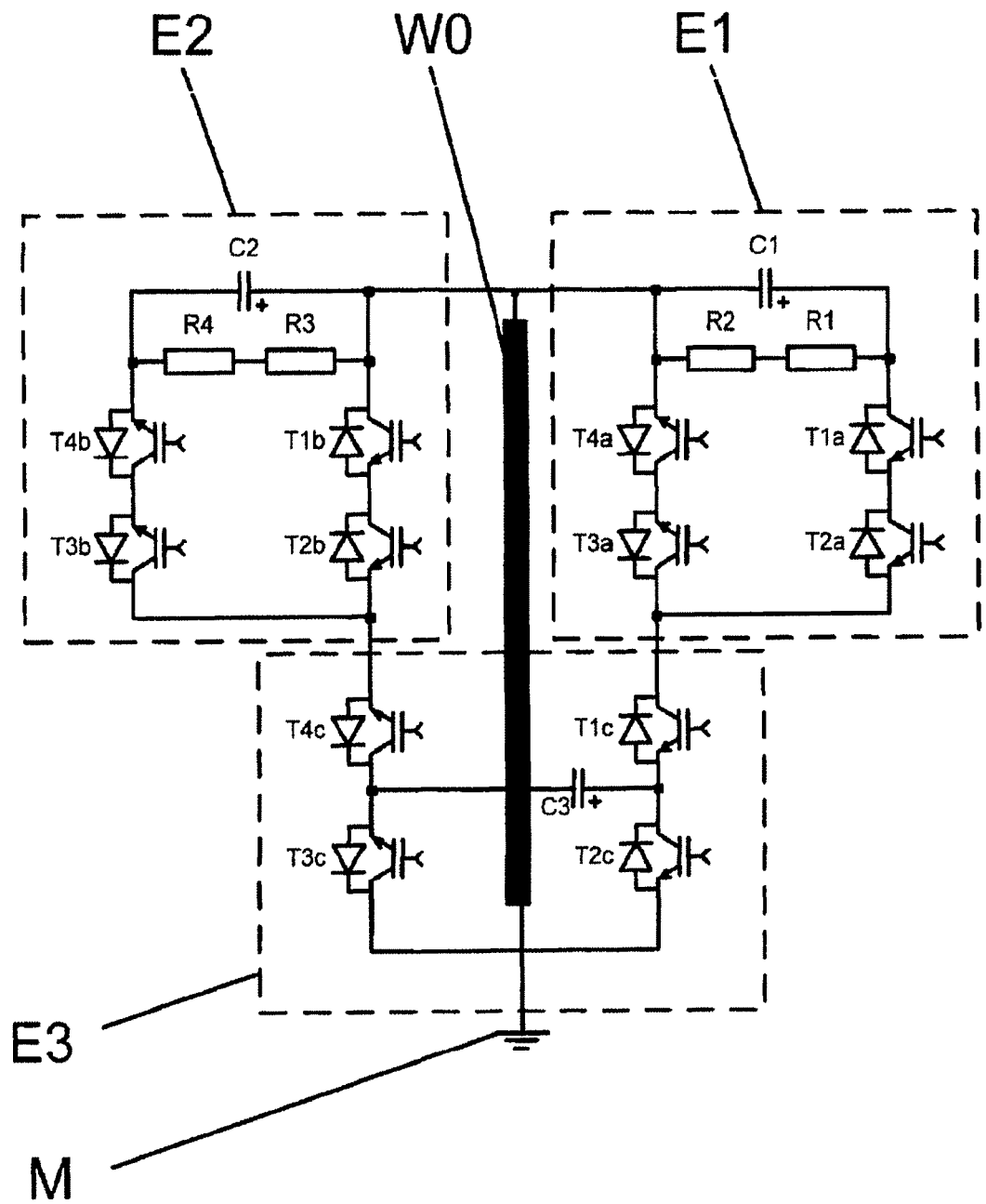
FIG. 1 shows a conventional circuit arrangement for electrically controlling power with a single heat dissipating device.

A central concept of the present disclosure consists in providing a minimum number of heat dissipating devices, wherein an individual heat dissipating device is clamped to a fixedly predetermined electrical potential. The fixedly predetermined potential can be an intermediate potential between two power control devices belonging to a power control module.

Therefore, the basic concept of the disclosure consists in providing per phase only three heat dissipating devices that are symmetrically clamped to a respective centre potential between the individual power control devices of a power control module. This firstly achieves an optimum reduction of a voltage loading between power semiconductor components and corresponding heat dissipating devices, wherein the number of components to be used is reduced by comparison with the prior art.

Furthermore, such an arrangement enables circuit arrangements for electrically controlling power to be designed in the form of dual H bridges. In this case, 3.3 kV standard components can be used for driver units designed for 4.16 kV.

A circuit arrangement according to the disclosure for electrically controlling power has at least one power control device and at least one heat dissipating device having a thermal contact with the at least one power control device, wherein the heat dissipating device is clamped to a fixedly predetermined electrical potential. The at least one heat dissipating device can be arranged in a manner electrically insulated from the at least one power control device. As a result, it is possible to obtain a further reduction of the voltage loading between power semiconductor components and corresponding heat dissipating devices.

In accordance with one exemplary embodiment of the present disclosure, the power control devices are formed by a series circuit comprising at least two power semiconductor components. In this case, a pair of power control devices forms a power control module. Three power control modules are expediently required for controlling one phase.

The power control devices of a module can be electrically connected to one another via a series circuit comprising discharge resistors.

In accordance with yet another exemplary embodiment of the present disclosure, the fixedly predetermined electrical potential to which the at least one heat dissipating device is clamped is determined by the discharge resistors. In this case, the discharge resistors represent voltage divider resistors.

In accordance with yet another exemplary embodiment of the present disclosure, the fixedly predetermined electrical potential to which the heat dissipating device is clamped amounts to a quarter of the link voltage of the circuit arrangements for electrically controlling power with respect to a ground potential.

In accordance with yet another exemplary embodiment of the present disclosure, the power control devices comprise first and second power control devices assigned to one another in such a way that they form a power control module, wherein the discharge resistors of the first and second power control devices clamp the fixedly predetermined electrical potential to a centre potential between connection points of the first and second power control devices.

Different heat conducting devices of different power modules can be clamped to different fixedly predeterminable electrical potentials independently of one another.

In accordance with yet another exemplary embodiment of the present disclosure, the at least one heat dissipating device is additionally electrically conductively connected to a connecting unit that electrically connects the at least two power semiconductor components of the power control devices to one another.

A circuit arrangement of this type achieves the object according to the disclosure, namely of providing electrical power control with efficient heat dissipation, wherein a small number of components are required, wherein a high voltage breakdown strength is simultaneously achieved.

An exemplary embodiment of the present disclosure will be described below with reference to FIG. 3.

Figure 3:
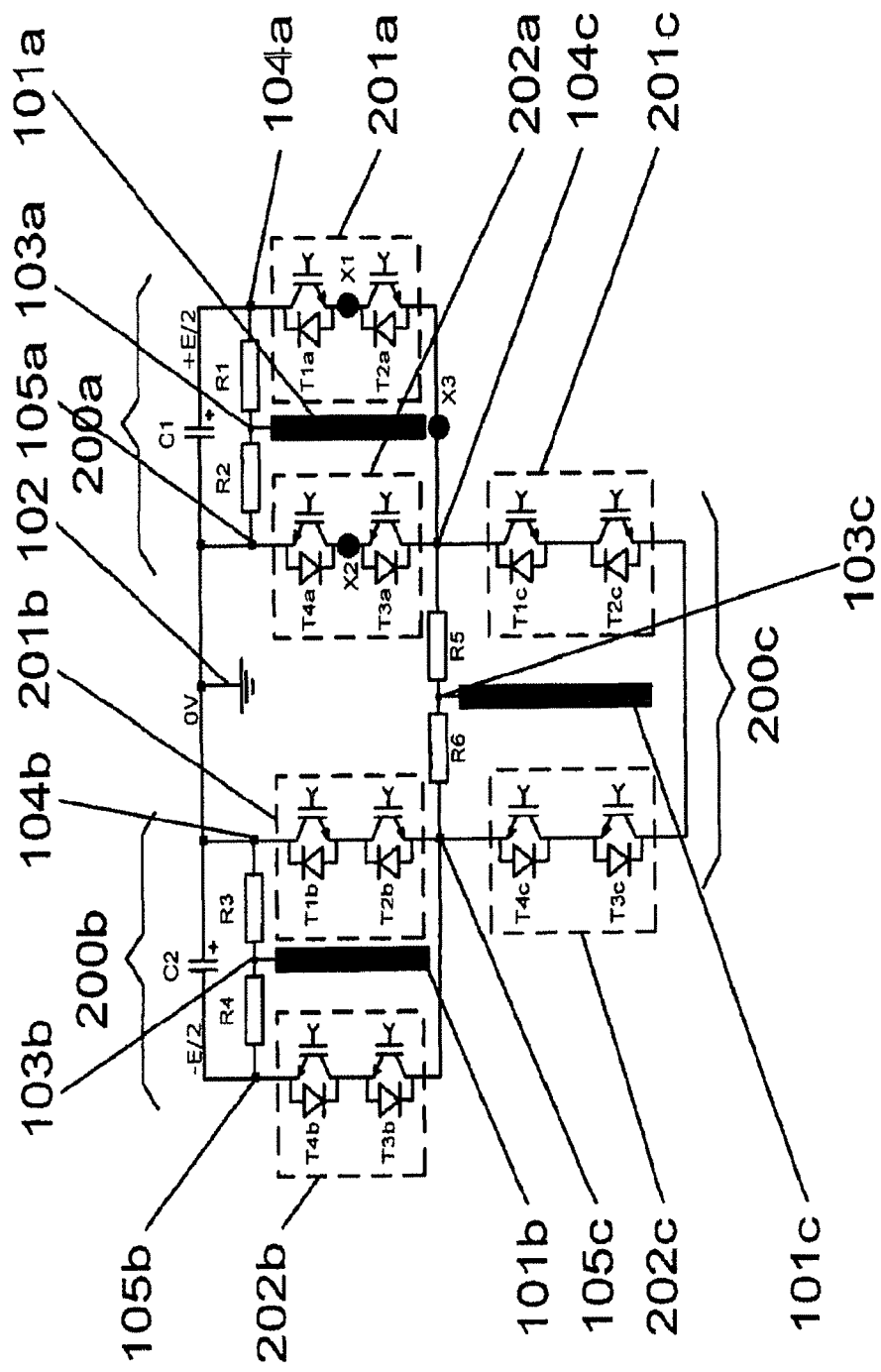
FIG. 3 shows a power control device with electrically clamped heat dissipating devices in accordance with an exemplary embodiment of the present disclosure.

FIG. 3 illustrates a circuit arrangement for electrically controlling power for one phase. Electrical three-phase power supplies require a circuit arrangement comprising three phase circuitry interconnections of the kind shown in FIG. 3. For illustrating a cooling arrangement according to the disclosure for a circuit arrangement for electrically controlling power it suffices to consider one phase in accordance with FIG. 3.

Figure 2:
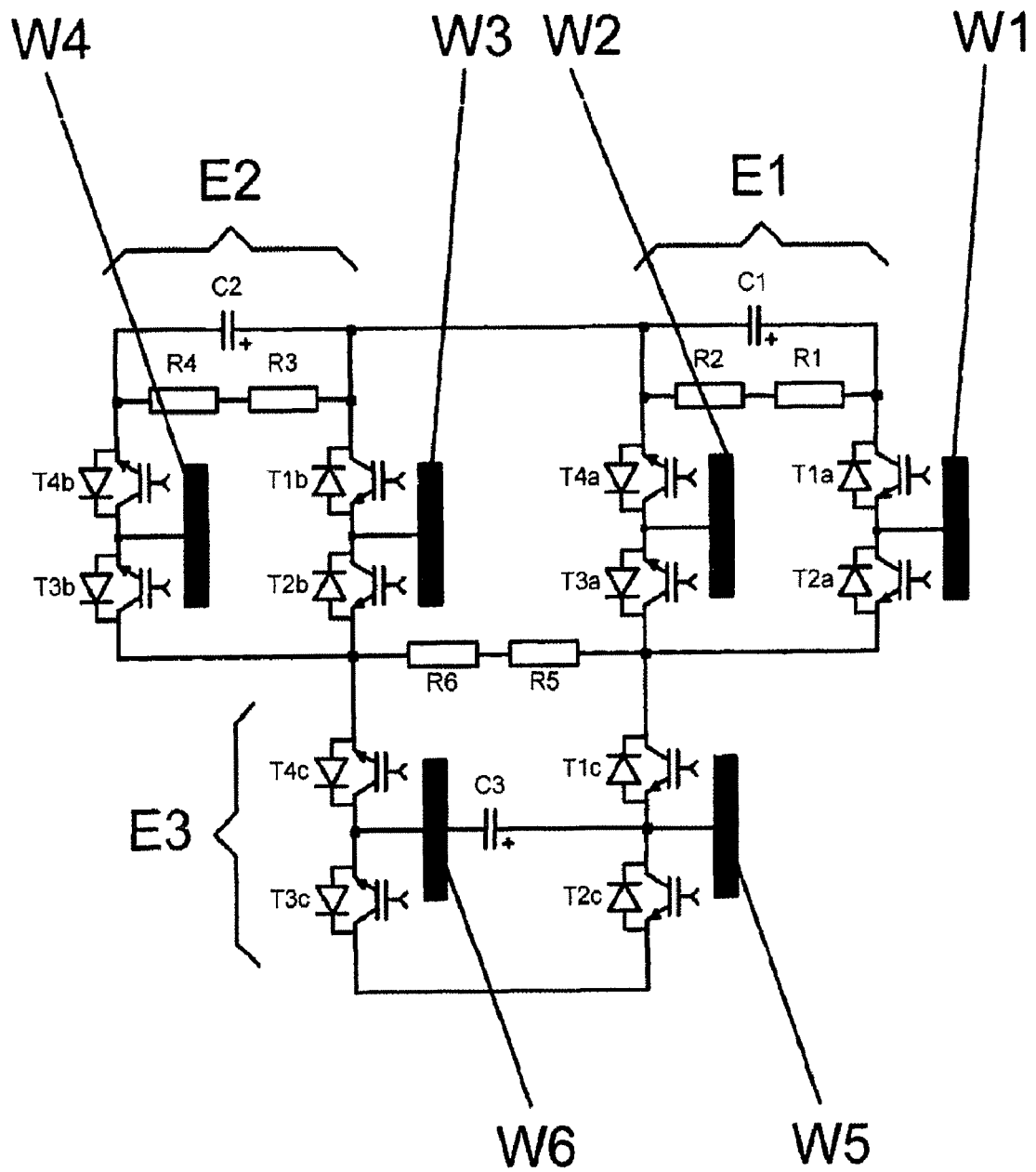
FIG. 2 shows a further conventional circuit arrangement for electrically controlling power with a plurality of floating heat dissipating devices.

The principle underlying the disclosure is based neither on providing a single heat dissipating device put at ground potential, as described with reference to a first conventional circuit arrangement of FIG. 1, nor on providing a large number of individual heat dissipating devices (two thereof per power control module), which then have to be at a freely floating potential, as described with reference to FIG. 2 above for a further conventional circuit arrangement for electrically controlling power.

As shown in FIG. 3, a phase of the circuit arrangement according to the disclosure for electrically controlling power has three heat dissipating devices 101a, 101b and 101c. The three heat dissipating devices 101a, 101b, 101c shown are neither at a ground potential 102 nor are they freely floating. Rather, the basic concept of the disclosure is discernible in the circuit arrangement in FIG. 3, namely of clamping the heat dissipating devices 101a-101c to a fixedly predetermined potential, that is to say to the corresponding electrical potentials 103a, 103b and 103c of the heat dissipating devices 101a, 101b and 101c, respectively, with respect to a reference potential, that is to say a ground potential 102.

The circuit arrangement for controlling power comprises three separately identifiable blocks, that is to say power control modules 200a, 200b and 200c. Each of said power control modules 200 has first and second power control devices 201, 202, which are jointly cooled by an assigned heat dissipating device 101a-101c.

Thus, the first and second power control devices 201a, 202a are arranged on the first heat dissipating device 101a and are thermally conductively connected thereto, the first and second power control devices 201b, 202b are arranged on the second heat dissipating device 101b and are thermally conductively connected thereto, while the first and second power control devices 201c and 202c are thermally conductively connected to the third heat dissipating device 101c. Furthermore, the respective heat dissipating device 101a, 101b, 101c is arranged in a manner electrically insulated from the associated power control device 201a, 202a, 201b, 202b, 201c, 202c, whereby it is possible to achieve a further reduction of the voltage loading between power semiconductor components T1a, T2a, T3a, T4a, T1b, T2b, T3b, T4b, T1c, T2c, T3c, T4c of the respective power control device 201a, 202a, 201b, 202b, 201c, 202c and the corresponding heat dissipating device 101a, 101b, 101c.

The first and second power control devices 201 and 202 are constructed in each case from a series circuit comprising power semiconductor components (e.g. IGBTs), wherein respective first connections of the power control devices are electrically connected to a common point, while first and second connection units 104a and 105a are connected to one another via a series circuit comprising two resistors R1, R2.

It should be pointed out that the reference symbols for the three separately identifiable power control modules 200a, 200b, 200c are provided with lower-case letters a, b, c in order to clarify the assignment to a corresponding power control module.

According to the disclosure, the discharge resistors R1, R2, which serve for discharging corresponding capacitors (capacitor units) C1, C2, form a voltage divider, wherein a centre tap at a junction point between the two resistors R1 and R2, or respectively R3 and R4, or R5 and R6 in each case forms a centre potential to which the corresponding heat dissipating device 101a, 101b or 101c, respectively, is clamped.

It is assumed hereinafter that the ground potential 102 is 0V. This then results in a link voltage of +E/2 present at the first connection unit 104a of the first power control device 201a of the first power control module 200a, while a negative link voltage (−E/2) is present at a second connection unit 105b of the second power control device 202b of the second power control module 200b.

A second connecting unit 107c that electrically connects at least two power semiconductor components T3c, T4c of the power control device 202c is referred to as a centre potential point and is electrically conductively connected to the heat dissipating device 101c.

The respective voltage divider resistors, which are formed by identical resistors in an exemplary embodiment of the present disclosure, that is to say that R1=R2 and R3=R4, have the effect that the respective heat dissipating devices 101a, 101b are clamped to an electrical potential 103a and 103b, respectively, which has a value of a quarter of the link voltage (E/4) with respect to ground 102 (0V).

Furthermore, three reference potential detection units X1, X2 and X3 are provided, at which it is possible to detect corresponding reference potentials of the power module 200a with respect to an electrical potential 103a of the heat dissipating device 101a.

Consequently, the object according to the disclosure is achieved, namely of providing a high voltage breakdown strength in conjunction with a reduction of the number of required components (in particular of the heat dissipating devices 101a-101c).

The circuit scheme for the arrangement of power control devices and heat dissipating devices as described with reference to FIG. 3 can in particular be applied to circuit topologies having the following configurations:

three level neutral point clamped (3LNPC);
three level active neutral point clamped (ANPC); and
ABB five-level topology (ABB5L).

In particular, the circuit arrangement and cooling arrangement described in accordance with the above exemplary embodiment with reference to FIG. 3 is suitable for being used in medium voltage operation.

Although the present disclosure has been described above on the basis of various exemplary embodiments, it is not restricted thereto, but rather can be modified in diverse ways.

Moreover, the disclosure is not restricted to the application possibilities mentioned.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

In the figures, identical reference symbols designate identical or functionally identical components or steps.
101a—Heat dissipating device
101c
102 Ground potential
103a—Electrical potential of the heat dissipating
103c device
104a—First connection unit
104c
105a—Second connection unit
105c
200a, Power control module
200b,
200c
201a—First power control device
201c
202a—Second power control device
202c
E Link voltage potential
C1-C2 Capacitor unit
R1-R6 Discharge resistor
T1-T6 Power semiconductor component
X1-X3 Reference potential detection unit

What is claimed is:

1. A circuit arrangement for electrically controlling power, comprising:
at least one power control device; and at least one heat dissipating device having a thermal contact with the at least one power control device, wherein the heat dissipating device is clamped to a fixedly predetermined electrical potential, and wherein the at least one heat dissipating device is arranged in a manner electrically insulated from the at least one power control device.

2. The circuit arrangement as claimed in claim 1, wherein the power control devices are formed by a series circuit comprising at least two power semiconductor components.

3. The circuit arrangement as claimed in claim 1, wherein the power control devices are electrically connected to one another via a series circuit comprising discharge resistors.

4. The circuit arrangement as claimed in claim 3, wherein the fixedly predetermined electrical potential to which the at least one heat dissipating device is clamped is determined by the discharge resistors.

5. The circuit arrangement as claimed in claim 3, wherein the fixedly predetermined electrical potential to which the heat dissipating device is clamped is a quarter of a link voltage of the circuit arrangement for electrically controlling power with respect to a ground potential.

6. The circuit arrangement as claimed in claim 3, wherein the power control devices comprise first and second power control devices assigned to one another, and the discharge resistors of the first and second power control devices clamp the fixedly predetermined electrical potential to a centre potential between connection points of the first and second power control devices.

7. The circuit arrangement as claimed in claim 1, wherein different heat dissipating devices can be clamped to different fixedly predetermined electrical potentials independently of one another.

8. The circuit arrangement as claimed in claim 2, wherein the power control devices are electrically connected to one another via a series circuit comprising discharge resistors.

9. A power-control arrangement, comprising:

at least one power control device, and a heat extraction device in thermal contact with the at least one power control device, the heat extraction device being configured to be clamped to a defined electric potential, and to be electrically insulated by the at least one power control device.

* * * * *